US012608480B2

(12) United States Patent
Nazari et al.

(10) Patent No.: US 12,608,480 B2
(45) Date of Patent: Apr. 21, 2026

(54) MULTI-FUNCTION UEFI DRIVER WITH UPDATE CAPABILITIES

(71) Applicant: NVIDIA CORPORATION, Santa Clara, CA (US)

(72) Inventors: Siamak Nazari, Mountain View, CA (US); Dana Myers, Mountain View, CA (US); Roopesh Tamma, San Ramon, CA (US); Stuart Davies, Fremont, CA (US); William Price, Alameda, CA (US)

(73) Assignee: Nvidia Corporation, Santa Clara, CA (US)

( * ) Notice: Subject to any disclaimer, the term of this patent is extended or adjusted under 35 U.S.C. 154(b) by 73 days.

(21) Appl. No.: 18/269,162

(22) PCT Filed: Dec. 22, 2021

(86) PCT No.: PCT/US2021/064865
§ 371 (c)(1),
(2) Date: Jun. 22, 2023

(87) PCT Pub. No.: WO2022/140544
PCT Pub. Date: Jun. 30, 2022

(65) Prior Publication Data
US 2024/0086544 A1 Mar. 14, 2024

Related U.S. Application Data

(60) Provisional application No. 63/177,145, filed on Apr. 20, 2021, provisional application No. 63/129,460, filed on Dec. 22, 2020.

(51) Int. Cl.
| | |
|---|---|
| *G06F 15/177* | (2006.01) |
| *G06F 9/00* | (2018.01) |
| *G06F 21/57* | (2013.01) |

(52) U.S. Cl.
CPC .................................. *G06F 21/575* (2013.01)

(58) Field of Classification Search
CPC ....... G06F 21/575; G06F 8/654; G06F 9/4411
See application file for complete search history.

(56) References Cited

U.S. PATENT DOCUMENTS

| | | | |
|---|---|---|---|
| 9,930,051 B1 | 3/2018 | Potlapally et al. | |
| 10,990,411 B2 * | 4/2021 | Zhu ........................... | G06F 8/63 |
| 11,182,171 B1 * | 11/2021 | Vidyadhara ........... | G06F 9/4411 |
| 12,130,926 B2 * | 10/2024 | Liu ........................ | G06F 21/575 |
| 2013/0013905 A1 * | 1/2013 | Held ..................... | G06F 21/572 |
| | | | 713/2 |

(Continued)

*Primary Examiner* — Xuxing Chen
(74) *Attorney, Agent, or Firm* — Hogan Lovells US LLP

(57) ABSTRACT

A driver, e.g., a UEFI driver (140), for a device (120) in a host (110) starts before an OS boot. The driver (140) provides functions including gathering information regarding the host system (110), directing the device (120) to transmit the gathered information to a cloud-based service (182), directing the device (120) to provide a catalog of current firmware, updating firmware in the host (110) or device (120) based on the catalog, and configuring the device (120). The device may be a storage processing unit (120) that is part of a cluster (100) that presents virtual volumes including a boot volume (138) for the host (110), and execution of the driver (140) can provide a delay until a boot volume (138) is ready.

15 Claims, 3 Drawing Sheets

300

HOST BEGINS EXECUTION OF THE UEFI DRIVER FOR A RESIDENT SPU — 310

UEFI DRIVER GATHERS INFORMATION FROM HOST AND PROVIDES GATHERED INFORMATION TO THE SPU — 320

UEFI DRIVER CONFIGURES THE SPU COMPUTING ENVIRONMENT — 330

GATHER INFORMATION ON SPU COMPUTING ENVIRONMENT — 340

PERFORM FIRMWARE UPDATE PROCESS — 350

IS SPU IN A POD? — 360

YES

362 — WAIT FOR VOLUME READY OR TIMEOUT

NO

UEFI DRIVER DONE WITH BOOT PROCESS — 364

UEFI DRIVER RECEIVES BOOT EXIT SERVICE NOTICE — 370

UEFI DRIVER GATHERS INFORMATION FROM HOST AND PROVIDES MORE GATHERED INFORMATION TO SPU — 372

SPU TRANSMIT GATHERED INFORMATION TO CLOUD SERVICE — 380

(56)         References Cited

U.S. PATENT DOCUMENTS

| | | | |
|---|---|---|---|
| 2015/0170145 A1* | 6/2015 | Patel | G06Q 20/3278 |
| | | | 705/44 |
| 2015/0205597 A1* | 7/2015 | Nishikawa | G06F 8/60 |
| | | | 717/172 |
| 2015/0370576 A1* | 12/2015 | Wynn | G06F 9/4403 |
| | | | 713/2 |
| 2016/0202964 A1* | 7/2016 | Butcher | G06F 8/654 |
| | | | 717/172 |
| 2017/0195386 A1* | 7/2017 | Nathan | H04L 67/56 |
| 2017/0235928 A1* | 8/2017 | Desai | G06F 21/572 |
| | | | 713/2 |
| 2018/0004505 A1* | 1/2018 | Annapureddy | G06F 21/572 |
| 2020/0133652 A1* | 4/2020 | Bhimanadhuni | G06F 9/4403 |
| 2020/0137354 A1* | 4/2020 | Nathan | G06V 20/52 |
| 2021/0279051 A1* | 9/2021 | Wu | G06F 8/656 |
| 2021/0303287 A1* | 9/2021 | Wiginton | G06F 8/65 |
| 2022/0066766 A1* | 3/2022 | Mysore Shantamurthy | |
| | | | G06F 9/4416 |
| 2022/0197624 A1* | 6/2022 | Chiu | G06F 8/65 |
| 2022/0405392 A1* | 12/2022 | Nix | H04L 9/3249 |

* cited by examiner

200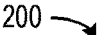
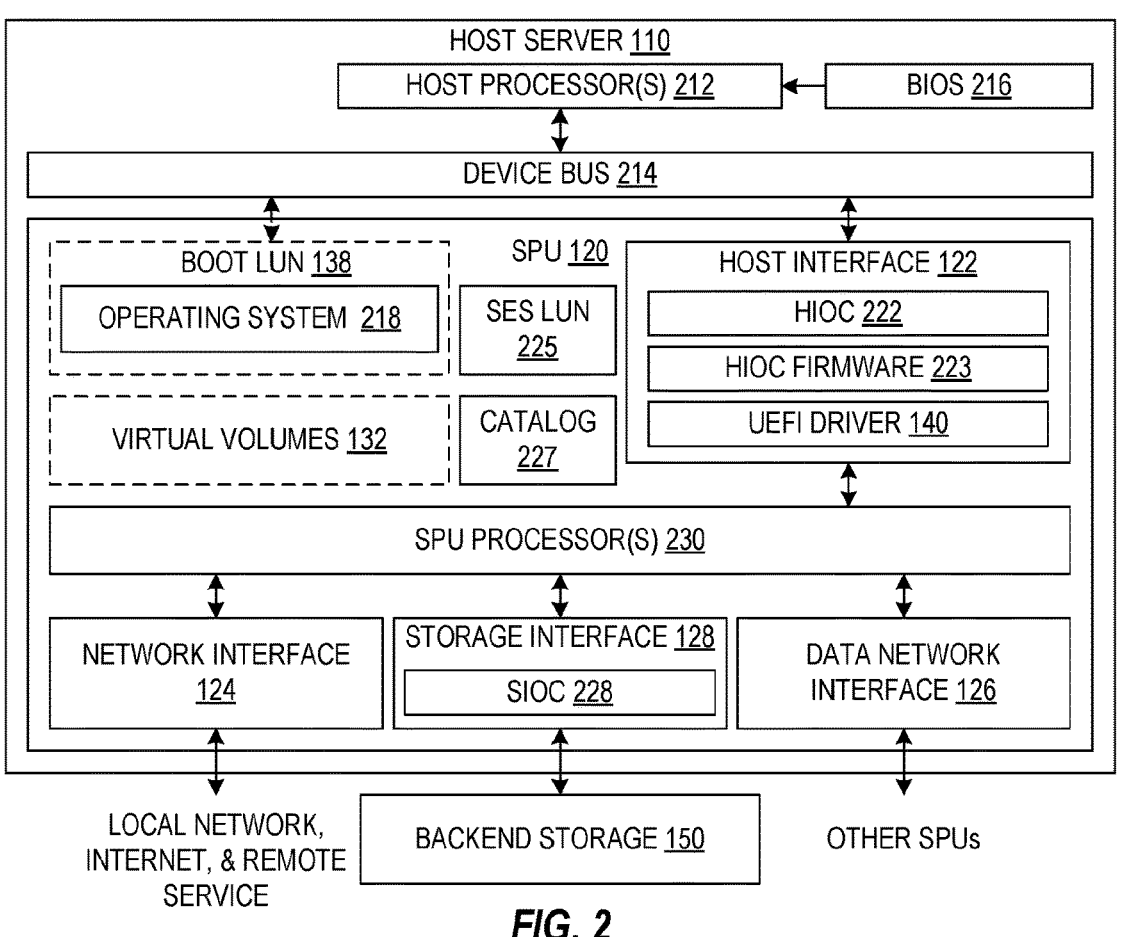
FIG. 2
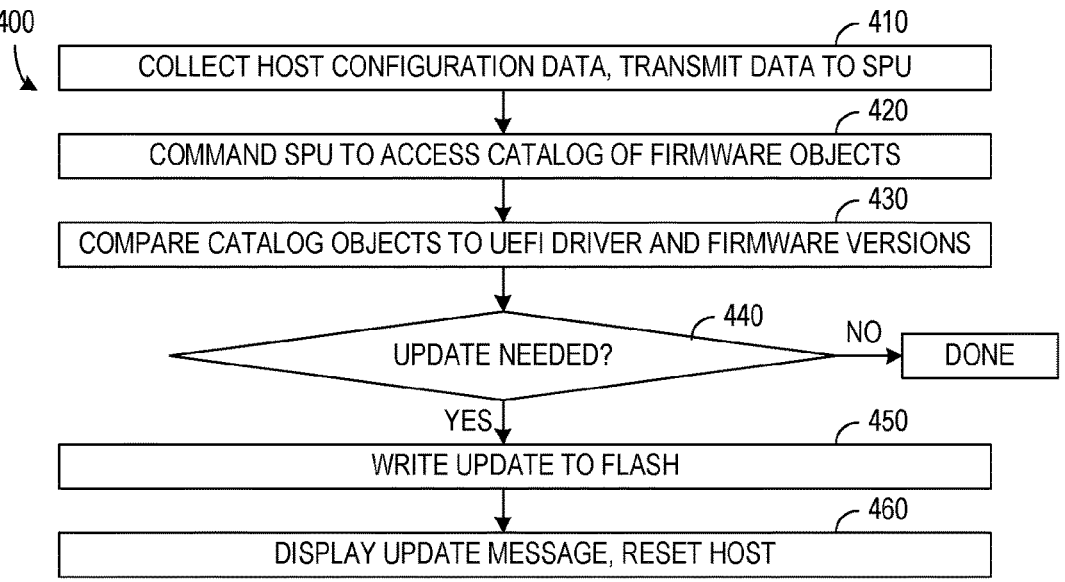
FIG. 4

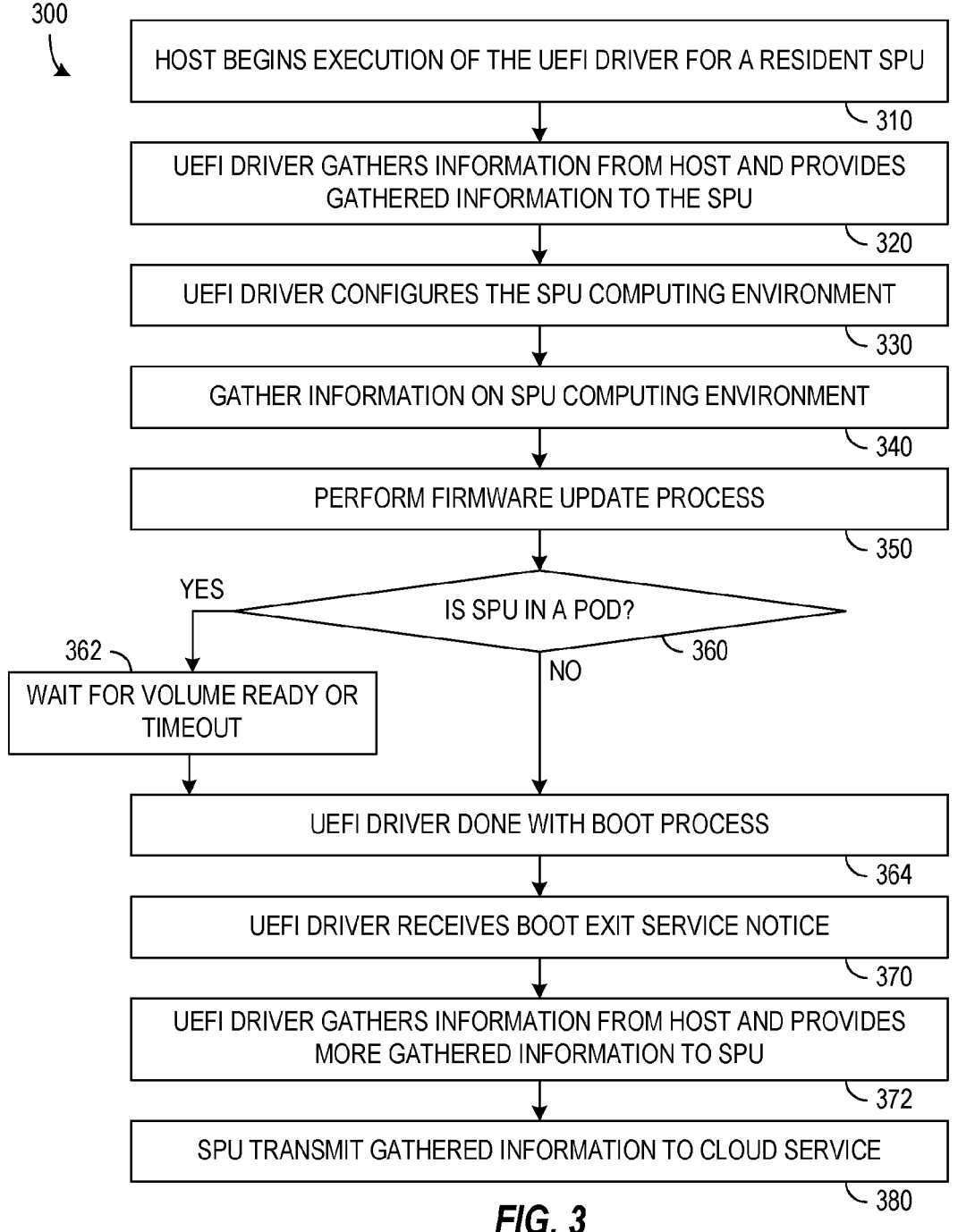

300

HOST BEGINS EXECUTION OF THE UEFI DRIVER FOR A RESIDENT SPU
310

UEFI DRIVER GATHERS INFORMATION FROM HOST AND PROVIDES GATHERED INFORMATION TO THE SPU
320

UEFI DRIVER CONFIGURES THE SPU COMPUTING ENVIRONMENT
330

GATHER INFORMATION ON SPU COMPUTING ENVIRONMENT
340

PERFORM FIRMWARE UPDATE PROCESS
350

IS SPU IN A POD?
360

YES

362
WAIT FOR VOLUME READY OR TIMEOUT

NO

UEFI DRIVER DONE WITH BOOT PROCESS
364

UEFI DRIVER RECEIVES BOOT EXIT SERVICE NOTICE
370

UEFI DRIVER GATHERS INFORMATION FROM HOST AND PROVIDES MORE GATHERED INFORMATION TO SPU
372

SPU TRANSMIT GATHERED INFORMATION TO CLOUD SERVICE
380

*FIG. 3*

MULTI-FUNCTION UEFI DRIVER WITH UPDATE CAPABILITIES

BACKGROUND

Unified Extensible Firmware Interface (UEFI) refers to a specification that defines a software interface between an operating system and platform firmware. A UEFI driver complies with the UEFI specification and works with the Basic Input Output System (BIOS) of a computing system to act as an interface between firmware and the operating system that the computing system uses. UEFI drivers particularly provide software interfaces to hardware devices, enabling an operating system and other computer programs to access hardware functions without needing to know precise details about the hardware being used. Like the BIOS, the UEFI driver presents to the operating system a standardized view of the hardware. Operating system developers may thus build on top of an UEFI driver and have their operating systems work with systems having a variety of different hardware. The UEFI driver in turn communicates with the device through a computer bus or communications subsystem to which the device connects.

BRIEF DESCRIPTION OF THE DRAWINGS

FIG. 2 is a block diagram illustrating a storage node in accordance with an example of the present disclosure.

FIG. 3 is a flow diagram of a power up process for a device using a UEFI driver in accordance with an example of the present disclosure.

FIG. 4 is a flow diagram of an update process that may be performed using a UEFI driver in accordance with an example of the present disclosure.

The drawings illustrate examples for the purpose of explanation and are not of the invention itself. Use of the same reference symbols in different figures indicates similar or identical items.

DETAILED DESCRIPTION

Figure 1:
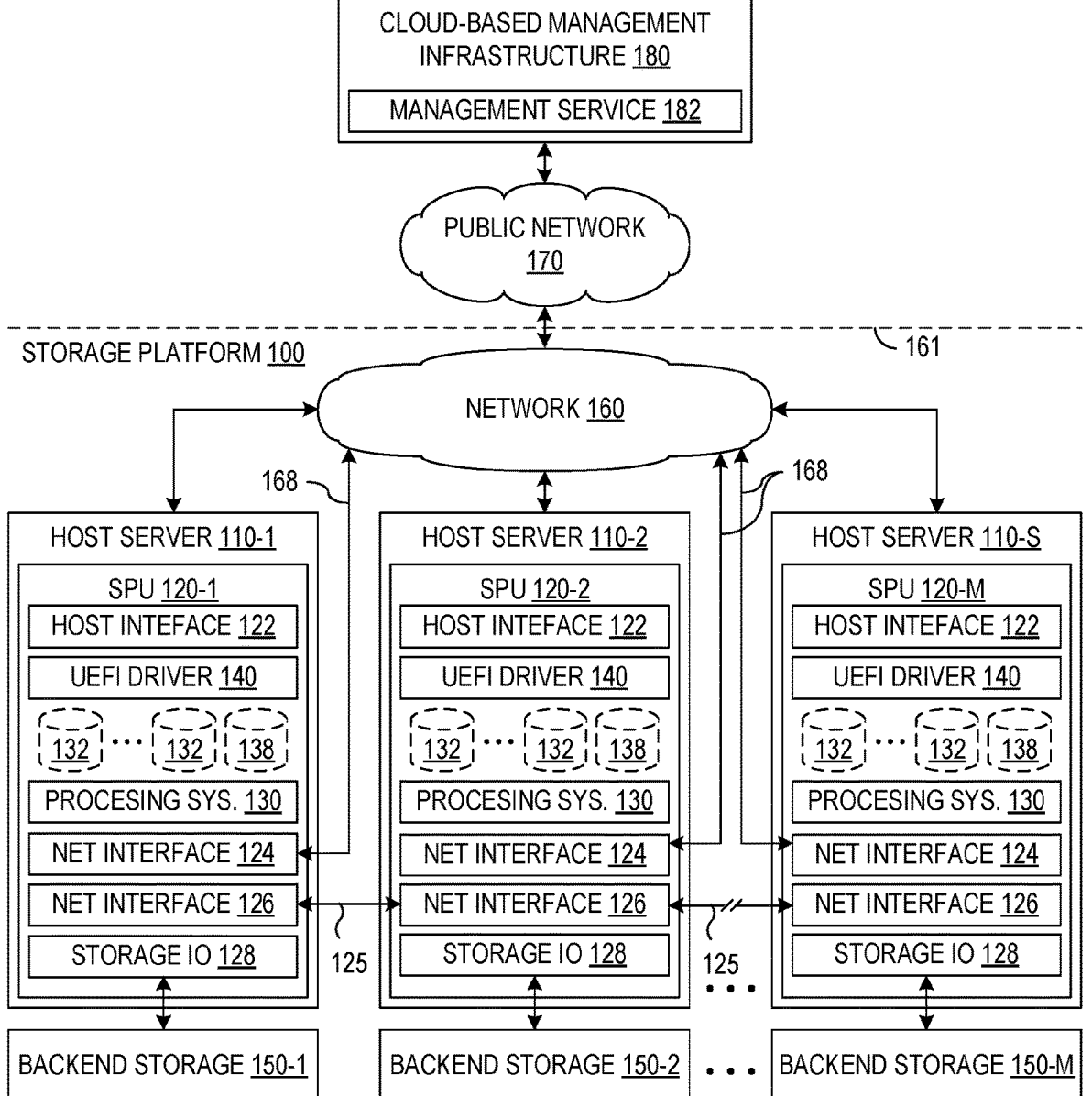
FIG. 1 is a block diagram illustrating a storage system including a storage platform in accordance with an example of the present disclosure.

An enterprise storage system using a cloud-based management service can reduce or eliminate many of the system management tasks that a human administrator needs to perform in a traditional storage system. The cloud-based management service may, for example, automate tasks including allocating a set of virtual volumes that efficiently meet the storage needs of servers and applications that run on the servers, distributing the virtual storage volumes to storage nodes in a cluster storage system, and providing a recipe for the storage nodes to create the efficient set of virtual volumes. For many tasks, the cloud-based management service needs information characterizing the storage system being managed. In accordance with an aspect of the current disclosure, a UEFI driver for a storage or service processing unit (SPU) performs multiple processes including configuring a computing environment in the SPU, ensuring a boot LUN (Logical Unit Number) for a host is ready to complete booting of the host, and identifying multiple characteristics of the enterprise storage system including the host and SPU so that the SPU may provide information to the cloud-based service that will manage the enterprise storage system. In accordance with an aspect of the current disclosure, a UEFI driver for a device such as an SPU may also perform update processes for firmware in a host or the devices.

FIG. 1 is a block diagram illustrating a storage architecture including a storage platform 100 in accordance with one example of the present disclosure. Storage platform 100 includes one or more host servers 110-1 to 110-S, which are sometimes generically referred to herein as host server(s) 110. Each host server 110 may be a conventional computer or other computing system including a central processing unit (CPU), memory, and interfaces for connections to internal or external devices. One or more storage or service processing units (SPUs) 120-1 to 120-M, which are sometimes generically referred to herein as SPU(s) 120, are installed in host servers 110. In general, storage platform 100 may include one or more host servers 110, with each server 110 hosting one or more SPUs 120. A minimum configuration may include a single host server 110 in which one or more SPUs 120 resides. To improve redundancy, storage platform 100 may be a cluster storage system including at least two host servers 110 and at least two SPUs 120, but more generally, a limitless number of different configurations are possible containing any number s of host servers 110 and any number m of SPUs 120. In general, storage platform 100 is scalable by adding more SPUs 120 with associated backend storage.

Each SPU 120 generally includes a host interface 122, network interfaces 124 and 126, a processing system 130, and a storage interface 128.

Host interface 122 provides communications between the SPU 120 and its host server 110. For example, each SPU 120 may be installed and fully resident in the chassis of an associated host server 110. Each SPU 120 may, for example, be implemented as a card, e.g., a Peripheral Component Interconnect Express (PCI-e) card, or printed circuit board with a connector or contacts that plug into a slot in a standard peripheral interface, e.g., a Peripheral Component Interconnect (PCI) bus in host server 110, and host interface 122 includes circuitry providing compliance with the protocols of the host server bus.

Network interfaces 124 and 126 in an SPU 120 provide communications with other SPUs 120 and to other network connected devices. Multiple SPUs 120, e.g., SPUs 120-1 to 120-M in FIG. 1, may be interconnected using high speed data links 125, e.g., one or more parallel 10, 25, 50, 100 or more Gbps Ethernet links, to form a dedicated data network for a pod or cluster of SPUs 120 in storage system 100. Network interfaces 126 and data links 125 may particularly form a high-speed data network that directly interconnects the SPUs 120 to work together in a "pod" or cluster, and the data network may be independent of a computer network 160 of the enterprise. Network interfaces 124 may allow each SPU 120 to communicate through private network 160 with any devices on network 160 and through private network 160, a firewall 161, and a public network 170, e.g., the Internet, with a cloud-based management infrastructure 180.

Processing system 130 in an SPU 120 includes one or more microprocessors or CPUs and memory that the SPU 120 employs to provide storage services. Processing system 130 may particularly implement a storage TO module that processes storage operations such as read and write requests from storage clients, e.g., from applications run on servers 110, targeting virtual storage volumes 132 and boot volumes 138.

SPUs 120-1 to 120-M respectively control backend storage 150-1 to 150-M, which is sometimes generically referred to herein as backend storage 150, and storage interface 128 in each SPU 120 includes circuitry and connectors for the attached backend storage 150. Backend storage 150 may employ, for example, hard disk drives, solid state drives, or other nonvolatile/persistent storage devices or media in which data may be physically stored, and backend storage 150 particularly may have a redundant array of independent disks (RAID) 5 or 6 configuration for performance and redundancy.

Each SPU 120 may employ network interface 124 and connections 168 to connect to a network, e.g., to local or enterprise network 160 and through network 160 and firewall 161 to public or wide area network 170, e.g., the Internet, and to cloud-based management infrastructure 180. Cloud-based management infrastructure 180 may include a computer or server that is remotely located from storage platform 100, and management infrastructure 180 provides a management service 182 to reduce the burden of storage management on an enterprise, e.g., to offload the burden of storage setup and management from a human administrator to an automated process. Cloud-based management service 182 may be used to manage SPUs 120, e.g., to configure SPUs 120 in a pod or cluster in storage platform 100, update software or firmware in SPUs 120 or host servers 110, monitor performance of storage platform 100, or provide analysis services. For example, management service 182, during a setup process, may determine an allocation of storage volumes 132 and 138 to meet the needs of an enterprise, distributed the allocated volumes to SPUs 120-1 to 120-M, and create a recipe that SPUs 120 can execute to bring storage platform 100 to the desired working configuration. Management service 182 may also automatically manage updates of software or firmware used in storage platform 100. Management service 182 may need data indicating the configuration of storage platform 100 in order to provide the desired management services.

FIG. 2 is a block diagram illustrating a computer system 200 that may act as a storage node in the cluster storage architecture of FIG. 1 or alternatively as a complete storage system or server. Computer system 200 includes a host computer or server 110. Host server 110 may be a conventional server or other computer that includes one or more processors 212 capable of running one or more applications under an operating system (OS) 218. In the example of FIG. 2, an SPU 120 maintains a virtual boot volume or LUN 138 that presents operating system 218 to the host 110. Operating system 218 may, for example, be a version of Microsoft Windows® or Linux®. Operating system 218 may be physically stored in backend storage 150 controlled by SPU 120. Host 110 further includes a device bus 214 to which one or more devices including SPU 120 may connect. Host server 110 further includes a Basic Input Output System (BIOS) that may be stored as firmware on a motherboard of host server 110 and that interacts with a UEFI driver 140 for SPU 120 when host server 110 and SPU 120 powers up or boots.

SPU 120 generally controls physical storage or backend media 150 as needed to present logical volumes, including boot LUN 138 and virtual storage volumes 132, to host 110 and to storage clients (not shown), which may run on or connect to host 110. SPU 120 includes a processing system 130 connected to four main functional interfaces including a host interface 122 for connection to the host server 110, a network interface 124 for connection to the Cloud, a data network interface 126 for communication with other SPUs in a pod, and a storage interface 128 for connection to backend media or local persistent storage 150.

Host interface 122 may include hardware such as a server slot connector configured to plug into a slot of host server 110, a host interface circuit configured to implement protocols host server 110 requires, and a power distribution circuit that receives power from host server 110 and distributes power to components of SPU 120 during normal operation. Host interface 122 may particularly include a controller 222, sometimes referred to herein as Host Input/Output Controller (HIOC) 222, that enables operation of SPU 120 as a PCI-e, SAS or SATA storage device for host server 110, and controller 222 has HIOC firmware 223 that HIOC 222 executes to provide host interface functionality.

Storage interface 128 may include storage interface circuits and connectors for connection to local storage devices or backend media 150. Storage interface 128 may particularly include a controller that enables operation of connected backend storage 150 as a PCI-e, Small Computer System Interface (SCSI), Serial-Attached SCSI (SAS), or Serial Advanced Technology Attachment (SATA) storage device.

Data network interface 126 is for communication with other SPUs, which may be similar or identical to SPU 120 and resident in other host servers (as illustrated in FIG. 1). Data network interface 126 may particularly be used for backup or "mirroring" of storage volumes and remote access to data of logical volumes that other the SPUs provide, and data network interface 126 may employ converters or adaptors implementing a high-speed connection. For example, data network interface 126 may include converters or adapters that provide dual Ethernet (could be two 25/100 GbE) ports, Infiniband, fiber channel, or other high data rate connections to the other SPUs in a pod.

Network interface 124 is for communication with the Cloud and may similarly employ a converter or adaptor implementing a conventional communication protocol, e.g., a 1 or 10 Gbps Ethernet interface or a wireless communication protocol such as Wi-Fi. Network interface 124 may particularly be configured to enable communication with a Cloud-based service that may be set up to manage, support, and maintain operation of SPUs such as SPU 120.

In an example implementation, SPU 120 has two onboard SAS input/output controllers (IOCs). In storage interface 128, one IOC (sometimes referred to as the SIOC) 228 is connected to the SPUs processor or System on Chip (SOC) 130. In host interface 122, another IOC (sometimes referred to as the host input/output controller or HIOC) 222 connects to device bus 214, e.g., a PCIe bus, of host server 110. The two IOCs 222 and 228 may be interconnected to via an on-board SAS link.

Host interface 122 includes non-volatile memory, e.g., flash memory, storing UEFI driver 140 that host server 110, under control of BIOS 216, runs during or after the server Power On Self-Test (POST) and before operating system boots. Host interface 122 also stores HIOC firmware 223 that SPU 120 or particularly HIOC 222 runs when interacting with execution of UEFI driver 140. In accordance with an aspect of the current disclosure, UEFI driver 140 may provide multiple functions before host server 110 boots operating system 218.

FIG. 3 is a flow diagram of a process 300 that may be performed by or during execution of UEFI driver 140. Process 300 may begin with a power up process 310 in which host server 110 and SPU 120 are beginning to power up or restart. Host server 110 during process 310 may perform a POST. During process 310, BIOS 216 in boot mode may retrieve UEFI driver 140 from host interface 122 for execution by host server 110.

Execution of UEFI driver 140 may start with a host inventory process 320 that collects information that identifies host server 110 and the configuration of host server 110. UEFI driver 140 may particularly access sources including a System Management Basic Input Output System (SMBIOS) table. The SMBIOS is well-known data structure that may be used in computer systems such as host server 110, and the SMBIOS contains data indicating details regarding host 110, the software and hardware components in host 110, and the configuration of those components. Initial collection of host inventory information in process 320 may occur at initialization of UEFI driver 140, but UEFI driver 140 may collect additional host inventory information in a process 372 that UEFI driver 140 performs when informed of the 'Boot Services Exit' as described further below. Some of the gathered host inventory information may pertain to or indicate a serial number of host server 110, an identification or classification of host processor 212, a type and version of operating system 218 that host server 110 will run when fully booted, and the physical PCIe configuration or other information regarding the connection of SPU 120 to its host 110. In some cases, SMBIOS information may not be complete at UEFI driver initialization time and must be updated at Exit Boot Services time, e.g., in information gathering process 372. UEFI driver 140 may transfer host inventory information to SPU 120 over an embedded Serial Attached SCSI (SAS) link via a SCSI Enclosure Service (SES) LUN 225 that the SPU 120 provides. SPU 120 receives the gathered host inventory information and may forward the gathered information to a cloud-based service 182 in a transmission process 380 as described further below. Without such information, the cloud-based service 182 may not have access to information about the server 110 in which SPU 120 is installed.

Execution of UEFI driver 140 in a configuration process 330 of process 300 may edit the configuration of the SPU computing environment. For example, process 330 may configure the management network port or interface 124 for communications with the cloud-based service 182 through the enterprise network 160. Configuration process 330 can seamlessly extend the UEFI driver environment into the SPU environment. A process 340 may gather information regarding SPU 120 or the configuration of the SPU computing environment.

Execution of UEFI driver 140 in accordance with an aspect of the current disclosure may include a firmware update process 350. As described further below, process 350 may check firmware, e.g., BIOS 216, installed in host computer 110 or firmware, e.g., UEFI driver 140 or HIOC firmware 223, installed SPU 120 and automatically update firmware if a newer version of the firmware is available.

Execution of UEFI driver 140 may also control timeouts according to the status of SPU 120 to ensure availability of a boot LUN 138 in a case where a pod including the SPU 120 may present the boot LUN 138 or a timely boot in a case where the pod including the SPU 120 is not required to present a boot LUN, e.g., when host server 110 may boot an operating system from a source other than the SPU 120 in the host server 110. A decision process 360 determines whether the SPU 120 is a member of a pod that may provide a boot LUN 138 for its server 110. If SPU 120 is a member of a pod, execution of UEFI driver 140 performs a delay process 362 until the SPU 120 indicates a volume is available or a time out period expires, the delay be sufficient for volumes to become available to make sure that host booting from such volumes is reliable. If the SPU 120 is not a member of pod that may provide boot volumes, execution of UEFI 140 does not delay for boot volumes to be ready, thus speeding-up the boot process and improving user experience when installing a new SPU 120. Whether or not delay process 362 is performed, execution of UEFI driver 140 may end in a process 364, so that host server 110 can continue its boot process, e.g., by executing a UEFI driver for another device in host server 110.

UEFI driver 140 in process 370 receives notification of an exit boot services event. Host server 110 may generate the exit boot services event to release UEFI resources after booting its operating system 218. Resumed execution of UEFI driver 140 in response to the exit boot service event performs information collection process 372 to gather detailed configuration of the distinctly separate computing environment of host server 110 and SPU 120. Once the desired information has been gathered, a transmission process 380 that SPU 120 performs can transmit the information gathered in processes 320 and 372 to the cloud-based service 182 through network interface 124.

Firmware, e.g., HIOC firmware 223 and UEFI driver 140 in SPU 120 and BIOS 216 in host server 110, may need an update after an SPU 120 is deployed in a host server 110. A server administrator could manually update the firmware and UEFI driver using either host OS based tools or UEFI based tools. These updates may be difficult for administrators to manage at scale, e.g., in an enterprise system containing many host servers 110 and SPUs 120 at several locations, and firmware may not get manually updated in the field because of the inconvenience.

In accordance with a further aspect of the present disclosure, an installed UEFI driver 140 may automatically update itself, HIOC firmware 223, or other firmware in host server 110. Host 110 generally performs a POST, which in this case covers all the steps between host 110 being powered on or restarted and host 110 starting to load the operating system 218. When the server POST runs UEFI driver 140, UEFI driver 140 can communicate with SPU 120 over an embedded SAS link via the SES LUN 225 presented by the SPU 120. For example, the host server 110 executing UEFI driver 140 at POST allows UEFI driver 140 to access the SES LUN 225 and read and write buffers that UEFI driver 140 may send through HIOC 222 to processes operating in the SPU 120, e.g., executed by processing system 130. UEFI driver 140 may request a catalog 227 of current firmware including available UEFI drivers and HIOC firmware. SPU 120 may have previously obtained catalog 227 from cloud-based service 182. Because each server operating system type and version, e.g., Linux, MS Windows, etc., may need firmware, e.g., HIOC firmware 223 and UEFI driver 140, that is specific to the operating system type and version, execution of the installed UEFI 140 may use the gathered SMBIOS inventory information and check catalog 227 for an update of the specific firmware for that server type. Similarly, catalog 227 may contain firmware objects obtained from cloud-based service 182 according to the gathered SMBIOS inventory information. If a newer version of the firmware, e.g., UEFI driver 140 or IOC firmware 223, is available, execution of the installed UEFI driver 140 retrieves the new UEFI driver or new HIOC firmware over the SAS link, so that UEFI driver 140 can load the driver and/or firmware into host 110 or SPU 120, e.g., in flash memory in host interface 122. After firmware loading, the installed UEFI driver 140 may then reboot the server 110 to activate the new firmware, e.g., new UEFI driver 140, HIOC firmware 223, and/or BIOS 216.

This firmware update mechanism can update any software component within the server 110, that can be updated in the UEFI environment. This includes, but is not limited to, server BIOS 215 and LOM firmware. LOM here refers to "Lights Out Management," which may elsewhere in the industry may be referred to as integrated Lights-Out (iLO) or Remote Access Controller (RAC).

FIG. 4 is a flow diagram illustrating a process 400 in accordance with an example of the present disclosure for updating of a UEFI driver 140, firmware 223, or other firmware in a device or a host. During host boot or UEFI initialization process 410, the installed UEFI driver 140 being executed in host 110 collects and transmits host configuration information to SPU 120 and SPU 120 transmits the host configuration information to cloud-based service 182 as described above with reference to FIG. 3.

UEFI driver 140 in a process 420 may use a command specific to SPU 120 to get SPU 120 to access catalog 227. Catalog 227 may already be present in SPU 120, e.g., as a result of a prior interaction of SPU 120 with cloud-based service 182. Alternatively, SPU 120 may retrieve or receive from a remote management infrastructure, e.g., cloud-based service 182, a catalog 227 containing available firmware objects that match the host configuration information. For example, SPU 120 can then send to cloud-based service 182 an SES request for catalog 227, and cloud-based service 182, in response to a SES command from SPU 120, provides a catalog of available firmware objects. In either case, cloud-based service 182 may control which firmware is in catalog 227, and thus, cloud-based service 182 can control which firmware the UEFI driver 140 may update.

For each firmware object available from catalog 227, the installed UEFI driver 140 in a process 430 compares the firmware from catalog 227 to the corresponding installed firmware in host server 110 or SPU 120. The method of comparison may depend on the type of firmware object. If version numbers identify firmware versions, process 430 may compare the version numbers. If no version numbers are present, process 430 may include a binary comparison of a firmware object from catalog 227 and installed version of the corresponding firmware.

A decision process 440 determines, based on the comparison 430, whether any firmware update is needed. If not, process 400 is complete. If an updated is needed, UEFI driver 140 in a process 450 writes the new firmware retrieved from catalog 227 to flash memory that stores the firmware in host 110 or SPU 120. After writing an updated version of firmware, UEFI driver 140 in a process 460 may reset the host 110 or display on a screen of host 110 or a remote console, a message, e.g., a text message, recommending a reset of host 110 to restart the boot/UEFI initialization and employ the newly flashed firmware.

The code in UEFI driver 140 controls the update process 400, so that update process 400 is independent of host operating system 218. Additionally, the update is not just independent of the host operating system, but also the LOM, which distinguishes update process 400 from being able to update from the LOM, as it allows updates to be vendor independent. The cloud-based service 182 can provide or update catalog 227 and contact SPU 120 or host 110 when updates become available, and in response, the host 110 may be rebooted to initiate the update process, e.g., process 400. Once updating is completed, the host 110 again reboots host OS 218 as usual to begin use of the new firmware. No user interaction is required with UEFI driver 140 during the update process.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although implementations have been disclosed herein, these implementations are only examples and should not be taken as limitations. Various adaptations and combinations of features of the implementations disclosed are within the scope of the following claims.

What is claimed is:

1. A method comprising:
   before a loading of an operating system in a host computer, executing, via a basic input output system (BIOS) of the host computer, a driver for a device connected to the host computer, the executing of the driver comprising:
   retrieving, from the host computer, one or more information comprising current firmware of the host computer and providing the one or more information to the device;
   providing the one or more information to a cloud-based management service for the device; and
   replacing, based on at least the one or more information, the current firmware in the host computer with updated firmware,
   wherein the driver gathers the one or more information as the host computer powers up and again as the host computer performs a boot service exit.

2. The method of claim 1, wherein the driver comprises a Unified Extensible Firmware Interface (UEFI) driver.

3. The method of claim 1, wherein the device comprises a service processing unit that is connected to a storage device, the service processing unit controlling the storage device and presenting virtual storage volumes to the host computer.

4. The method of claim 3, wherein the virtual storage volumes include a boot volume from which the host computer loads the operating system.

5. The method of claim 4, further comprising the driver delaying until the device is ready to present the boot volume to the host computer.

6. The method of claim 1, further comprising the driver configuring a computing environment in the device.

7. The method of claim 6, wherein configuring the computing environment of the device comprises configuring the device to be able to communicate through a network.

8. The method of claim 1, further comprising the driver delaying while a boot volume is being readied for presentation to the host computer.

9. The method of claim 1, wherein providing to the device the one or more information regarding the host computer comprises:
   accessing a System Management Basic Input Output System (SMBIOS) table to gather the one or more information from the host computer; and
   transmitting the one or more information from the host computer to the device.

10. A method performed before loading of an operating system in a host computer, the method comprising:
   executing, via a basic input output system (BIOS) of the host computer, a driver for a device connected to the host computer, the executing of the driver including:
   providing a catalog of firmware to a cloud-based management service for the device;

commanding the device to access the catalog of firmware;

comparing the firmware from the catalog to firmware in the device or the host computer; and in response to the firmware in the device or the host computer differing from the firmware in the catalog, replacing the firmware in the device or the host computer with the firmware in the catalog, wherein the driver gathers the catalog of firmware as the host computer powers up and again as the host computer performs a boot service exit.

11. The method of claim 10, wherein the driver comprises a Unified Extensible Firmware Interface (UEFI) driver.

12. The method of claim 10, further comprising restarting the host computer after updating the firmware in the device.

13. The method of claim 10, wherein executing the driver further comprises sending, to the device, host configuration data indicating a configuration of the host computer, and the device transmitting the host configuration data to a cloud-based service, and wherein the cloud-based service returns the catalog including current firmware that corresponds to the configuration of the host computer.

14. The method of claim 10, wherein the device comprises a service processing unit that is connected to a storage device, the service processing unit controlling the storage device and presenting virtual storage volumes to the host computer.

15. The method of claim 10, wherein the catalog includes one or more of an updated UEFI driver, updated firmware for a host interface of the device, and an updated BIOS for the host computer.

\* \* \* \* \*